T. H. CURTIS.
STAY BOLT FOR STEAM BOILERS.
APPLICATION FILED MAY 5, 1911.
1,002,230.
Patented Sept. 5, 1911.
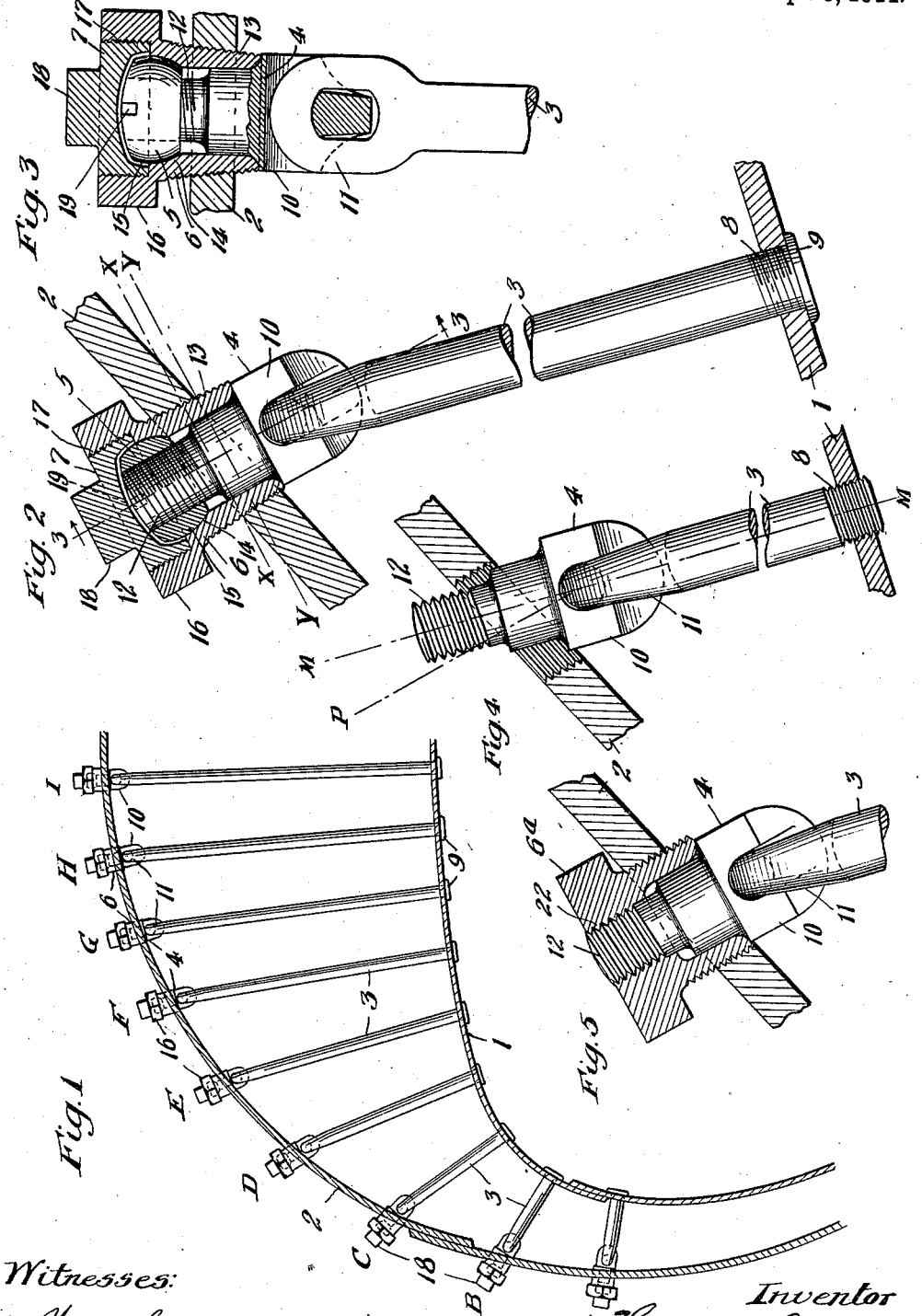
Witnesses:
Wm. Geiger
W. A. McClure
Inventor
Theodore H. Curtis

UNITED STATES PATENT OFFICE.

THEODORE H. CURTIS, OF LOUISVILLE, KENTUCKY.

STAY-BOLT FOR STEAM-BOILERS.

1,002,230. Specification of Letters Patent. Patented Sept. 5, 1911.

Application filed May 5, 1911. Serial No. 625,203.

*To all whom it may concern:*

Be it known that I, THEODORE H. CURTIS, a citizen of the United States, residing in Louisville, in the county of Jefferson and State of Kentucky, have invented a new and useful Improvement in Stay-Bolts for Steam-Boilers, of which the following is a specification.

My invention relates to improvements in stay bolts for steam boilers.

The object of my invention is to provide an improved construction of flexible stay bolt for steam boilers, comprising a plurality of members, preferably two, an inner one and an outer one flexibly connected together, and having a hollow sleeve that may be screwed into the outer sheet of the boiler at such angle that at least one or more of the threads of the hollow sleeve member will always be completely inclosed in the outer sheet of the boiler, so as to effect the necessary steam tight joint required, while at the same time the inner member of the stay bolt which is screwed into the inner or fire box sheet of the boiler may extend as required approximately at right angles to to the inner sheet of the boiler, and in which, in applying the stay bolt to the inner sheet of the boiler, both the inner and outer members of the stay bolt may have their axes in the same straight line to enable the inner member of the bolt to be readily screwed into the inner sheet, and in which both members of the stay bolt may be readily inserted through the opening in the outer sheets of the boiler, and in which the outer member of the stay bolt may have a separable connection with the hollow sleeve member that is screwed into the outer sheet of the boiler, and in which also access may be had to the outer end of the outer member of the stay bolt without danger of loosening the hollow sleeve member which is screwed into the outer sheet of the boiler.

My invention consists in the novel construction of parts and devices and the novel combinations of parts and devices herein shown and described by which this object or result is practically accomplished, the same being more particularly specified in the claims.

In the accompanying drawing forming a part of this specification, Figure 1 is a sectional view showing a portion of a locomotive steam boiler provided with stay bolts embodying my invention. Fig. 2 is an enlarged detail view, partly in section, of one of the stay bolts. Fig. 3 is a detail section on line 3—3 of Fig. 2, but showing the inner and outer members of the stay bolt with their axes in the same straight line. Fig. 4 is a detail view, illustrating the position of the parts when screwing the inner member of the stay bolt into the inner or fire box sheet of the boiler, and Fig. 5 illustrates a modification.

In the drawing, 1 represents the inner or fire box sheet of a locomotive or other boiler, 2 the outer or shell sheet of the boiler, the steam or water space being between the two sheets, 3 the inner member of my flexible stay bolt, 4 the outer member thereof, 5 the removable or screw threaded nut or bearing member of the outer member 4 of the stay bolt which is screw threaded to said member 4, 6 the hollow sleeve member which is screwed into the outer sheet of the boiler and 7 a removable screw threaded plug secured to the hollow sleeve member and inclosing the outer end of the outer member 4 of the stay bolt and its screw threaded nut or bearing member 5.

The inner member 3 of the stay bolt is secured by screw threads 8 at its inner end to the inner sheet 1 of the boiler and by the customary upsetting or riveting 9. The inner and outer members, 3, 4 of the stay bolt are flexibly connected together by a knuckle joint which permits one of the members to turn pivotally in respect to the other to a limited extent, and preferably comprising a pair of interengaging eyes or loops 10, 11 on the two members 3, 4. The other member 4 of the flexible stay bolt is furnished at its outer end with screw threads 12 to receive its removable nut or bearing member 5 which has a bearing or engagement with the hollow sleeve member 6 which has external screw threads 13 for screwing it into the outer sheet 2 of the boiler. The hollow sleeve member 6 has preferably a curved ball bearing or partly spherical seat 14 for engagement with the correspondingly curved or partly spherical inner portion 15 of the removable nut or bearing member 5 of the outer member of the stay bolt. The hollow sleeve member 6 is also furnished at its outer end with an enlarged hollow wrench head 16, preferably hexagonal in form, and with internal screw threads 17 to receive the removable screw threaded plug 7 which is provided at its outer end with a wrench head 18, preferably square. The removable screw threaded nut or bearing member 5 of the outer member 4 of the stay bolt which engages and bears against the hollow sleeve member 6 is preferably furnished with a slot 19 to receive a screw driver to remove the same when required.

My improved flexible stay bolt is specially adapted for use at that portion of the boiler where the inner and outer sheets 1, 2 extend at angles to each other and are materially out of parallel with each other. As the inner boiler sheet 1 is relatively thin and exposed to the fire, it is necessary that all of the stay bolts be spaced evenly in this inner sheet and practically at right angles to it. Variation in the spacing of the stay bolts in the outer sheet 2 may, however, be made, as the outer sheet is relatively thick and also not exposed to fire.

At those portions of the boiler where the inner and outer sheets are substantially parallel with each other, a single piece stay bolt may of course be used, such, for example, as at A, B, G, H or I, and possibly F, as indicated in Fig. 1 of the drawing. But in the intermediate positions, such as C, D and E, where the inner and outer sheets extend at a material angle to each other, it is obvious that the screw threads of the hollow sleeve member 6 or 6ª will not hold and be steam tight when the axis P of the hollow sleeve member is the same as the axis M of the stay bolt. In my invention, I therefore make provision for separating or turning the axis of the hollow sleeve member 6 from the axis of the inner portion or member of the stay bolt. In practice, the angle between the sheet and the hollow sleeve member should, of course, be as near to right angles as possible, and this angle should at no time be so great that one or more threads of the hollow sleeve member will not always be completely inclosed in the sheet as shown in the zone between the lines X X and Y Y, in Fig. 2 of the drawing. As the inner and outer sheets 1, 2 of the boiler are not parallel, and as the axis M of the inner member of the stay bolt 3 is not at right angles to the inner sheet 1 of the boiler when it is viewed from the front or back, as shown in Fig. 1, but is at right angles to the inner sheet 1 when viewed from either side, it is therefore very important for practical operation in tapping a hole in the inner sheet 1 that the long tap may be introduced through the hole in the outer sheet 2, as in this way the proper alinement may be easily maintained by simply inserting a guiding bushing temporarily in the hole in the outer sheet 2 to guide the tap. It is also important, in order to practically apply or screw the inner member 3 of the stay bolt into the inner sheet 1, that the stay bolt may be introduced through the hole in the outer sheet 2, as shown in Fig. 4 of the drawing, with both the inner and outer members of the stay bolt in the same straight line, while the inner member is being screwed into the inner sheet. A threaded hole in the outer sheet 2 which receives the hollow sleeve member 6 or 6² is made large enough for both the inner and outer members of the stay bolt to pass through the same, and for both members to be brought into the same straight line while the inner member 3 is being applied or screwed into the inner sheet 1 of the boiler. After the stay bolt is thus introduced through the hole in the outer sheet 2 and screwed into the inner sheet 1, the outer or shank member 4 of the stay bolt is then tilted to the axis P, as shown in Fig. 4, and the hollow sleeve member 6 is slipped over the outer or shank member 4 of the stay bolt and screwed into the outer sheet firmly and then the removable screw threaded nut or bearing member 5 is applied, thus tightening the stay bolt and then the plug member 7 is screwed into the hollow sleeve member 6, thus inclosing the outer end of the stay bolt and its removable bearing member or nut 5.

By applying one wrench to the wrench head 18 of the plug 7 and another wrench to the wrench head 16 of the hollow sleeve member 6, to hold said socket member firmly from turning, the plug 7 may be readily removed without danger of unscrewing or loosening the hollow sleeve member 6 in the outer sheet 2 of the boiler.

In the modification illustrated in Fig. 5, the external screw threads 12 on the outer or shank member 4 of the stay bolt engage the internal screw threads 22 that are provided in the hollow sleeve member 6ª.

I claim:—

1. The combination of inner and outer boiler sheets at an angle to each other, the said sheets being tapped respectively with bolt holes opposite to each other and on different axes, and a stay bolt having an inner member and an outer member flexibly connected together, and an externally screw-threaded sleeve member engaged by the outer bolt member, substantially as set forth.

2. The combination of inner and outer boiler sheets at an angle to each other, the said sheets being tapped respectively with bolt holes opposite to each other and on different axes, and a stay bolt having an inner member and an outer member flexibly connected together, a removable bearing head on the outer member, and a hollow sleeve having a seat for the said head and an externally screw-threaded inner end, substantially as set forth.

3. In a stay bolt the combination of an inner member and an outer member flexibly connected together, the flexible connection being near the outer end of the bolt whereby it is brought close to the outer boiler sheet, a removable bearing head on the outer member, a hollow sleeve having a seat for the said head and an externally screw-threaded inner end, and means for inclosing the outer end of the bolt head, substantially as set forth.

4. In a stay bolt the combination of an inner member and an outer member flexibly connected together, a socket member having an externally screw-threaded inner end and a seat to receive the head of the outer member of the stay bolt, and provided with a hollow internally screw-threaded wrench head at its outer end for holding the socket member as described, and an externally screw-threaded plug member having a wrench head at its outer end, substantially as specified.

5. The combination with inner and outer boiler sheets, of a flexible stay bolt connecting said boiler sheets and comprising an inner member and an outer member flexibly connected and adapted to be turned at an angle to each other, the outer boiler sheet having a threaded opening therein to permit both members of the stay bolt to be approximately in line with each other while the inner member is being applied and screwed into the inner boiler sheet, the outer member of the stay bolt being adapted to be turned at an angle to the inner member after the inner member is screwed into the inner sheet of the boiler, and a hollow sleeve member being adapted to be screwed into the outer sheet of the boiler after the inner member of the stay bolt has been secured to the inner sheet of the boiler, said outer sheet of the boiler having its bolt hole on an axis different from the axis of the inner bolt member and one or more of its screw threads for reception of the hollow sleeve member entirely inclosed in and by said sheet, substantially as specified.

THEODORE H. CURTIS.

Witnesses:
W. A. McCLURE,
WARD BARNUM.

Copies of this patent may be obtained for five cents each, by addressing the "Commissioner of Patents, Washington, D. C."